United States Patent
Mitra et al.

(10) Patent No.: US 11,265,713 B2
(45) Date of Patent: Mar. 1, 2022

(54) VALIDATING VEHICLES TRAVELING WITHIN SPECIFIC REGIONS

(71) Applicant: Ford Global Technologies, LLC, Dearborn, MI (US)

(72) Inventors: Pramita Mitra, West Bloomfield, MI (US); Amanuel Zeryihun, Pinole, CA (US); Eric H. Wingfield, Ann Arbor, MI (US); Abhishek Sharma, Ann Arbor, MI (US); James Fishelson, Ypsilanti, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 16/601,004

(22) Filed: Oct. 14, 2019

(65) Prior Publication Data
US 2021/0112410 A1 Apr. 15, 2021

(51) Int. Cl.
| H04W 12/06 | (2021.01) |
| H04W 12/069 | (2021.01) |
| H04W 4/40 | (2018.01) |
| H04L 9/06 | (2006.01) |
| H04L 9/08 | (2006.01) |
| H04W 12/63 | (2021.01) |

(52) U.S. Cl.
CPC ......... *H04W 12/069* (2021.01); *H04L 9/0637* (2013.01); *H04L 9/0825* (2013.01); *H04W 4/40* (2018.02); *H04W 12/63* (2021.01)

(58) Field of Classification Search
None
See application file for complete search history.

(56) References Cited

U.S. PATENT DOCUMENTS

| 10,167,092 B2 | 1/2019 | Byers et al. | |
| 10,249,198 B2 | 4/2019 | Taveira | |
| 2001/0055388 A1* | 12/2001 | Kaliski, Jr. | H04L 9/085 380/30 |
| 2004/0092231 A1* | 5/2004 | Ayatsuka | H04L 63/08 455/41.2 |
| 2004/0111207 A1* | 6/2004 | Weed | B60T 7/16 701/70 |
| 2007/0293996 A1* | 12/2007 | Mori | G01C 21/005 701/23 |
| 2018/0212780 A1* | 7/2018 | Talamonti | H04L 9/3247 |
| 2019/0025818 A1 | 1/2019 | Mattingly et al. | |
| 2019/0220721 A1* | 7/2019 | Chhabra | G06F 21/85 |

* cited by examiner

*Primary Examiner* — William J. Goodchild
(74) *Attorney, Agent, or Firm* — Brandon Hicks; Bejin Bieneman PLC

(57) ABSTRACT

A system comprises a computer including a processor and a memory. The memory storing instructions executable by the processor to transmit an authentication request to a vehicle computer, receive, from the vehicle computer, a response including data proving that the vehicle computer includes confidential information, wherein the data does not convey the confidential information, determine whether the response is valid based on the authentication request, and transmit a warning to the vehicle computer when the response is not valid.

18 Claims, 6 Drawing Sheets

VALIDATING VEHICLES TRAVELING WITHIN SPECIFIC REGIONS

BACKGROUND

In some instances, vehicles that transport goods are required to provide credentials at checkpoints to verify those vehicles are authorized to travel and/or transport goods within a specific region. Typically, the credentials include personally identifiable information, such as license plate numbers, vehicle identification numbers (VINs), or the like.

DETAILED DESCRIPTION

Figure 1:
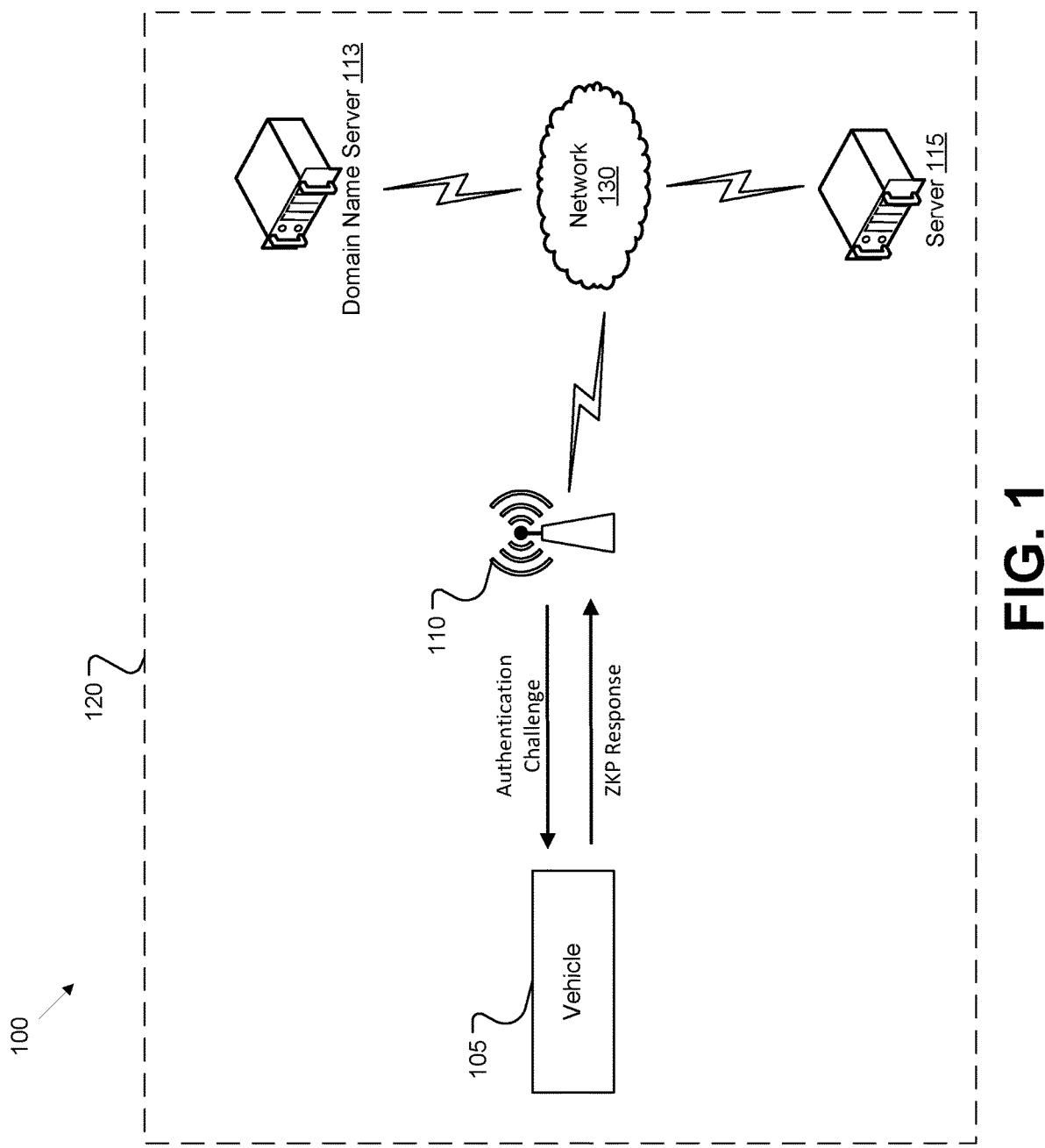
FIG. 1 is a diagram of an example system for validating vehicles traveling within a specific region.

Transportation-as-a-Service (TaaS), or Mobility-as-a-Service (MaaS), involves providing transportation solutions to consumers as a service. Transportation solutions can include the transportation of customers or the transportation of goods for customers. In some instances, entities, such as governmental entities, e.g., Federal Aviation Administration, may restrict the third-party transportation of goods through specified regions. In these instances, these entities may require a TaaS provider to register vehicles used in the transportation of goods. Registration information/data may be stored in publicly available data logs, such as blockchains. For example, the entities may store information regarding approved TaaS operators in a blockchain. As vehicles that transport goods travel through various regions, the entities may require periodic auditing of the vehicle's credentials to travel within the region. During the audit, the entities may be privy to operator data that results in data asymmetry between the operator and the auditing entity.

A system comprises a computer including a processor and a memory. The memory storing instructions executable by the processor to transmit an authentication request to a vehicle computer, receive, from the vehicle computer, a response including data proving that the vehicle computer includes confidential information, wherein the data does not convey the confidential information, determine whether the response is valid based on the authentication request, and transmit a warning to the vehicle computer when the response is not valid.

In other features, the authentication request comprises at least one point to be evaluated by the vehicle computer and the response comprises an evaluation of a polynomial using the at least one point.

In other features, the vehicle computer causes at least one vehicle system to actuate based on the warning.

In other features, the vehicle computer is disposed within a vehicle.

In other features, the vehicle comprises at least one of a land vehicle, an aerial vehicle, or an aquatic vehicle.

In other features, the processor is further programmed to determine whether the vehicle is authorized to travel within a specific region based on the response.

In other features, the processor is further programmed to receive a registration corresponding to the vehicle computer, the registration including vehicle information, generate a private key and a public key corresponding to the vehicle computer, wherein the private key and the public key are indicative of a specific region that the vehicle is allowed to travel, store the public key and the vehicle information in a blockchain block, and transmit the private key to the vehicle computer.

In other features, the private key comprises a polynomial.

In other features, the processor is further programmed to determine whether a communication link is established with the vehicle computer, retrieve the public key and the vehicle information from the blockchain block based on a communication packet received from the vehicle computer, and generate the authentication request based on at least one of the public key or the vehicle information.

In other features, the processor is further programmed to determine whether the response is valid by applying a blind evaluation of a polynomial protocol to the response.

A method comprises transmitting an authentication request to a vehicle computer, receiving, from the vehicle computer, a response including data proving that the vehicle computer includes confidential information, wherein the data does not convey the confidential information, determining whether the response is valid based on the authentication request, and transmitting a warning to the vehicle computer when the response is not valid.

In other features, the authentication request comprises at least one point to be evaluated by the vehicle computer and the response comprises an evaluation of a polynomial using the at least one point.

In other features, the vehicle computer causes at least one vehicle system to actuate based on the warning.

In other features, the vehicle computer is disposed within a vehicle.

In other features, the vehicle comprises at least one of a land vehicle, an aerial vehicle, or an aquatic vehicle.

In other features, the vehicle comprises an autonomous vehicle.

In other features, the method further comprises receiving a registration corresponding to the vehicle computer, the registration including vehicle information, generating a private key and a public key corresponding to the vehicle computer, wherein the private key and the public key are indicative of a specific region that the vehicle is allowed to travel, storing the public key and the vehicle information in a blockchain block, and transmitting the private key to the vehicle computer.

In other features, the private key comprises a polynomial.

In other features, the method further comprises determining whether a communication link is established with the vehicle computer, retrieving the public key and the vehicle information from the blockchain block based on a communication packet received from the vehicle computer, and generating the authentication request based on at least one of the public key or the vehicle information.

In other features, the method further comprises determining whether the response is valid by applying a blind evaluation of a polynomial protocol to the response.

The present disclosure is directed to systems and methods that allow vehicles that transport goods to provide authorized travel credentials through privacy preserving protocols, such as Zero-Knowledge Proofs. Thus, the vehicle, in response to an authentication request, may provide a response that indicates the vehicle is authorized to travel within the region and that does not provide personally identifiable information. Personally identifiable information may be user identification, vehicle identification numbers, license plate numbers, and the like.

A blockchain is a distributed electronic ledger. Each blockchain node stores a local copy of the same blockchain ledger. When a blockchain node generates a new block and proposes to link with a previous block, the previous block is stored locally at the generating node as well as all other nodes on the same blockchain. Each blockchain node verifies the new block against their local copy to determine whether consensus is reached within the network. If consensus is reached, the new block is added by each node to their local copy.

The blockchain stores data based on generation of hashes for blocks of data. A hash in the present context is a one-way encryption of data having a fixed number of bits. An example of hash encryption is SHA-256. The hashes provide links to blocks of data by identifying locations of the block of data in storage (digital memory), for example by use of an association table mapping the hashes of the storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key.

FIG. 1 is a block diagram of an example system 100 that includes a vehicle 105, a network device 110, a Domain Name Server (DNS) device 113, and a server 115 within a communication environment 120. In an example implementation, the communication environment 120 corresponds a specific region in which the vehicle 105 may be authorized to travel. While illustrated as within the communication environment 120, it is understood that the server 115 may be located in other regions or environments.

As disclosed in greater detail herein, as the vehicle 105 travels through the communication environment 120, the network device 110 may initiate communication with the vehicle 105. The server 115, via the network device 110, may transmit an authentication request to the vehicle 105 to ensure the vehicle 105 has proper credentials to travel within the environment 120. In an example implementation, the authentication request is a Zero-Knowledge Proof (ZKP) challenge. In response to the authentication request, the vehicle 105 may transmit a response to the server 115 verifying the vehicle 105 has proper credentials to travel within the environment 120. In the example implementation, the verification is a ZKP generated response based on the ZKP challenge. For example, the ZKP response may provide sufficient proof that the vehicle 105 is associated with a private key authorizing the vehicle 105 to travel within the specific environment 120 while not providing the private key. It is understood that the ZKP protocols discussed herein may be implemented as interactive ZKP challenges or non-interactive ZKP challenges.

The ZKP is a protocol by which one party, the vehicle 105, can prove to another party, such as a verifier, the server 115, that a given statement is true without conveying any information apart from the fact that the statement is indeed true. For example, the ZKP is a protocol related to two or more parties and includes a series of steps adopted by the two or more parties to complete a task. In this context, the prover proves to the verifier that the prover has certain confidential information without revealing the confidential information to the verifier. Within the present context, the vehicle 105 may provide a response indicating the vehicle 105 is associated with a private key distributed by the server 115.

The server 115 generates a custom request corresponding to the vehicle 105. For example, when communication has been established, communication packets transmitted by the vehicle 105 can include an Internet Protocol (IP) address. The server 115 can provide the vehicle's 105 IP address to the DNS device 113, and the DNS device 113 can return information corresponding to the IP address. For example, the DNS device 113 may return a domain name mapped to the IP address. The server 115 can access a blockchain (see FIG. 3) to retrieve information corresponding to the vehicle 105. For example, the server 115 may use the domain name to retrieve provided information pertaining to the vehicle 105 based on the domain name. The information may have been provided to the server 115 during registration. Additionally, the information includes a public key generated by the server 115 for the vehicle 105. Using the retrieved information and/or the domain name, the server 115 generates the custom ZKP challenge for the vehicle 105.

The system 100 may utilize one or more suitable ZKP protocols for verification purposes. In an example implementation, the system 100 may employ ZKP responses having Homomorphic Hiding (HH) properties. Homomorphic Hiding properties may include:

For a given number x, it is hard to find x given function $E(x)$;

Different inputs correspond to different outputs—so if $x \neq y$ (where y is a number), then $E(x) \neq E(y)$; and If a party knows $E(x)$ and $E(y)$, that party can generate the HH of arithmetic expressions in x and y. For example, the party can compute $E(x+y)$ from $E(x)$ and $E(y)$.

In an example, the computer 210 can prove to the computer 235 that the computer 210 has access to x and y such that $x+y=10$. The vehicle 105 computer 210 may transmit $E(x)$ and $E(y)$ to the computer 235, and the computer 235 computes $E(x+y)$ from $E(x)$ and $E(y)$. The computer 235 also computes $E(10)$ to determine whether $E(x+y)$ equals $E(10)$ and accepts the proof provided by the computer 210.

Using the HH properties, the computers 210, 235 may incorporate a blind evaluation of a polynomial protocol for authentication purposes. Within the current context, the computer 210 may include a polynomial P of degree d, and the computer 235 may include a point $s \in F_p$ randomly selected by the computer 235, where $F_p$ includes the elements $\{0, \ldots, p-1\}$ and addition and multiplication are computed using mod p, where p is a prime number. A polynomial P of degree d over $F_p$ can take the form as represented in Equation 1:

$$P(X) a_0 + a_1 \cdot X + a_2 \cdot X^2 + \ldots + a_d \cdot X^d. \quad \text{Eq. 1.}$$

The polynomial P can be evaluated at point $s \in F_p$ by substituting the point s for X as represented in Equation 2:

$$P(s)=a_0+a_1 \cdot s+a_2 \cdot s^2+\ldots+a_d \cdot s^d, \quad \text{Eq. 2.}$$

For an entity that knows P, the value P(s) is a linear combination of values $1, s, s^d$ and $a_0 \ldots a_d$ represent weights of the polynomial P(s). As discussed above, the HH properties allow the function E(x+y) to be computed from E(x) and E(y). In this context, given a, b, E(x), and E(y), an entity can compute E(ax+by) because of the following mathematical relations:

$$E(ax+by)=g^{ax+by}=g^{ax} \cdot g^{by}=(g^x)^a \cdot (g^y)^b=E(x)^a \cdot E(y)^b.$$

The computer 235 may transmit an authentication request according to the blind evaluation of a polynomial protocol. For instance, the computer 235 may request a solution to E(P(s)), and the computer 210 possesses the polynomial P. The blind evaluation may be performed by (Step 1) the computer 235 transmitting E(1), E(s), . . . , $E(s^d)$ to the computer 210, and (Step 2) the computer 210 computes E(P(s)) from the elements transmitted in Step 1. The computer 210 then transmits the solution E(P(s)) to the computer 235 for verification purposes. The computer 235 can compute E(P(s)) because the function E supports linear combinations, and P(s) is a linear combination of $1, s, \ldots, s^d$.

In an example implementation, a private key of a private/public key pair provided to vehicle 105 may comprise a polynomial. The polynomial may correspond to the public key, e.g., another polynomial, stored by the server 135. The private/public key pair can indicate specific regions that the vehicle 105 is approved to travel in. For example, to ensure that the vehicle 105 is authorized to transport goods within the region, the server 135 may request that the vehicle 105 computer 210 evaluate the vehicle's 105 polynomial at numerical values, e.g., points selected by the server 135. In response, the vehicle 105 computer 210 evaluates, i.e., computes, the polynomial at the selected values and provides the computed values to the server 135. Based on the computed values, the server 135 determines whether the vehicle 105 computer 210 is in possession of the correct polynomial.

As shown in FIG. 1, the server 115 is connected to the network device 110 and the DNS device 113 via a communication network 130. The network 130 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

Figure 2:
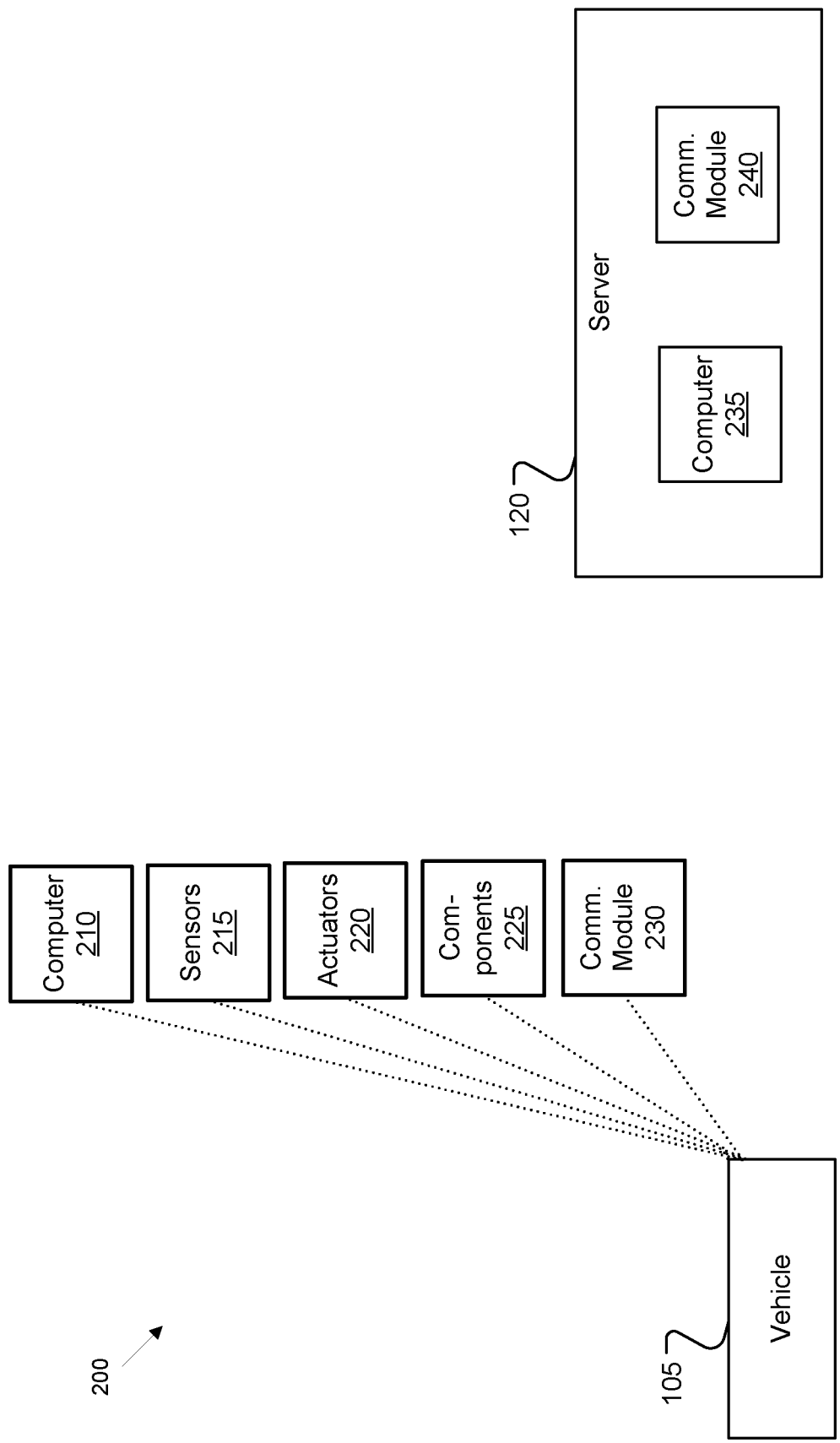
FIGS. 2A and 2B are diagrams of example devices disposed within the system illustrated in FIG. 1.

FIG. 2A is a block diagram of an example vehicle control system 200. The system 200 includes a vehicle 105, which can be a land vehicle such as a car, truck, etc., an aerial vehicle such as a drone, or an aquatic vehicle, such as a boat. The vehicle 105 includes a computer 210, vehicle sensors 215, actuators 220 to actuate various vehicle components 225, and a vehicle communications module 230. Via a network, the communications module 230 allows the computer 210 to communicate with the network device 110 and/or the server 115.

The computer 210 includes a processor and a memory. The memory includes one or more forms of computer-readable media, and stores instructions executable by the computer 210 for performing various operations, including as disclosed herein.

The computer 210 may operate a vehicle 105 in an autonomous, a semi-autonomous mode, or a non-autonomous (manual) mode. For purposes of this disclosure, an autonomous mode is defined as one in which each of vehicle 105 propulsion, braking (e.g., stopping), and steering are controlled by the computer 210; in a semi-autonomous mode the computer 210 controls one or two of vehicles 105 propulsion, braking, and steering; in a non-autonomous mode a human operator controls each of vehicle 105 propulsion, braking, and steering.

The computer 210 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 210, as opposed to a human operator, is to control such operations. Additionally, the computer 210 may be programmed to determine whether and when a human operator is to control such operations.

The computer 210 may include or be communicatively coupled to, e.g., via the vehicle 105 communications module 230 as described further below, more than one processor, e.g., included in electronic controller units (ECUs) or the like included in the vehicle 105 for monitoring and/or controlling various vehicle components 225, e.g., a powertrain controller, a brake controller, a steering controller, etc. Further, the computer 210 may communicate, via the vehicle 105 communications module 230, with a navigation system that uses the Global Position System (GPS). As an example, the computer 210 may request and receive location data of the vehicle 105. The location data may be in a known form, e.g., geo-coordinates (latitudinal and longitudinal coordinates).

The computer 210 is generally arranged for communications on the vehicle 105 communications module 230 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 210 may transmit messages to various devices in the vehicle 105 and/or receive messages from the various devices, e.g., vehicle sensors 215, actuators 220, vehicle components 225, a human machine interface (HMI), etc. Alternatively or additionally, in cases where the computer 210 actually comprises a plurality of devices, the vehicle 105 communications network may be used for communications between devices represented as the computer 210 in this disclosure. Further, as mentioned below, various controllers and/or vehicle sensors 215 may provide data to the computer 210.

Vehicle sensors 215 may include a variety of devices such as are known to provide data to the computer 210. For example, the vehicle sensors 215 may include Light Detection and Ranging (lidar) sensor(s) 115, etc., e.g., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 215, e.g., fixed to vehicle 105 bumpers may provide data to provide and range velocity of objects (possibly including second vehicles 106), etc., relative to the location of the vehicle 105. The vehicle sensors 215 may further include camera sensor(s) 215, e.g. front view, side view, rear view, etc., providing images from a field of view inside and/or outside the vehicle 105.

The vehicle 105 actuators 220 are implemented via circuits, chips, motors, or other electronic and or mechanical components that can actuate various vehicle subsystems in accordance with appropriate control signals as is known. The actuators 220 may be used to control components 225, including initiating operation, braking, acceleration, steering, and/or control of the vehicle 105.

In the context of the present disclosure, a vehicle component 225 is one or more hardware components adapted to perform a mechanical or electro-mechanical function or operation—such as moving the vehicle 105, slowing or stopping the vehicle 105, steering the vehicle 105, etc. Non-limiting examples of components 225 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, etc.

In addition, the computer 210 may be configured for communicating via a vehicle-to-vehicle communication module or interface with devices outside of the vehicle 105, e.g., through a vehicle-to-vehicle (V2V) or vehicle-to-infrastructure (V2X) wireless communications to another vehicle. The module 230 could include one or more mechanisms by which the computer 210 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 230 include cellular, Bluetooth®, IEEE 802.11, dedicated short range communications (DSRC), and/or wide area networks (WAN), including the Internet, providing data communication services.

FIG. 2B is a block diagram of an example server 115. The server 115 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices within the respective environment 120. In one or more implementations, the server 115 may operate one or more aspects of the blockchain within a trusted execution environment (TEE). For example, the server 115 may include suitable hardware, software, firmware, or combinations thereof to execute the functionality described herein.

Figure 3:
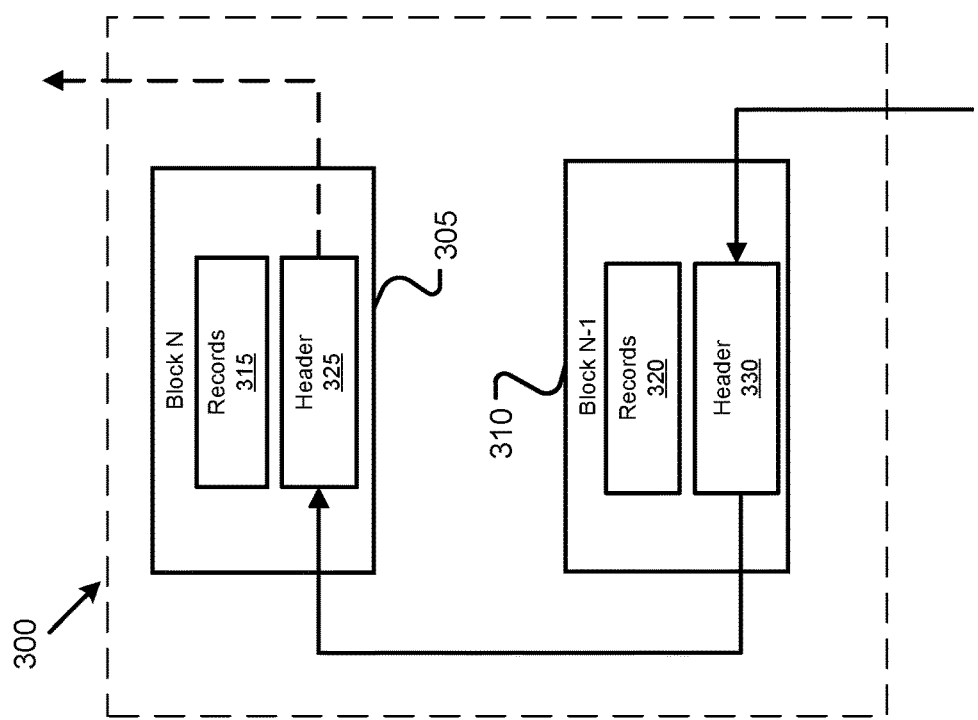
FIG. 3 is a diagram of example blockchain including multiple blockchain blocks that store registered vehicle information.

FIG. 3 illustrates example blocks 305, 310 of a blockchain 300 stored by the blockchain nodes. It is understood that the blockchain 300 can include additional or fewer blocks. Each block 305, 310 maintains verified records 315, 320. The records 315, 320 represent events, records, and/or transactions that have been executed between two or more participants within the blockchain 300. Each record 315, 320 is verified by a majority of the blockchain nodes. It is understood that the records 315, 320 can correspond to financial transactions and/or to non-financial transactions, e.g., transportation records, public keys, authorized transporters. The blocks 305, 310 also includes a respective header 325, 330 including a hash. The hash is derived from the contents of the records 315, 320 in the respective block 305, 310 and can be used to connect blocks 305, 310.

Within the present context, the blocks 305, 310 can store public identifiable information corresponding to the vehicle 105. In an example implementation, the vehicle's 105 owner registers the vehicle 105 with a government entity. The registration can include public vehicle information, such as public identification information, corresponding to the vehicle 105, and the public vehicle information can be stored in the blocks 305, 310 of the blockchain. The government entity, in turn, can provide a credential indicating the vehicle 105 is authorized to transport goods within the environment 120. The credentials for the vehicle 105 can be stored in the vehicle 105 computer 210.

Figure 4:
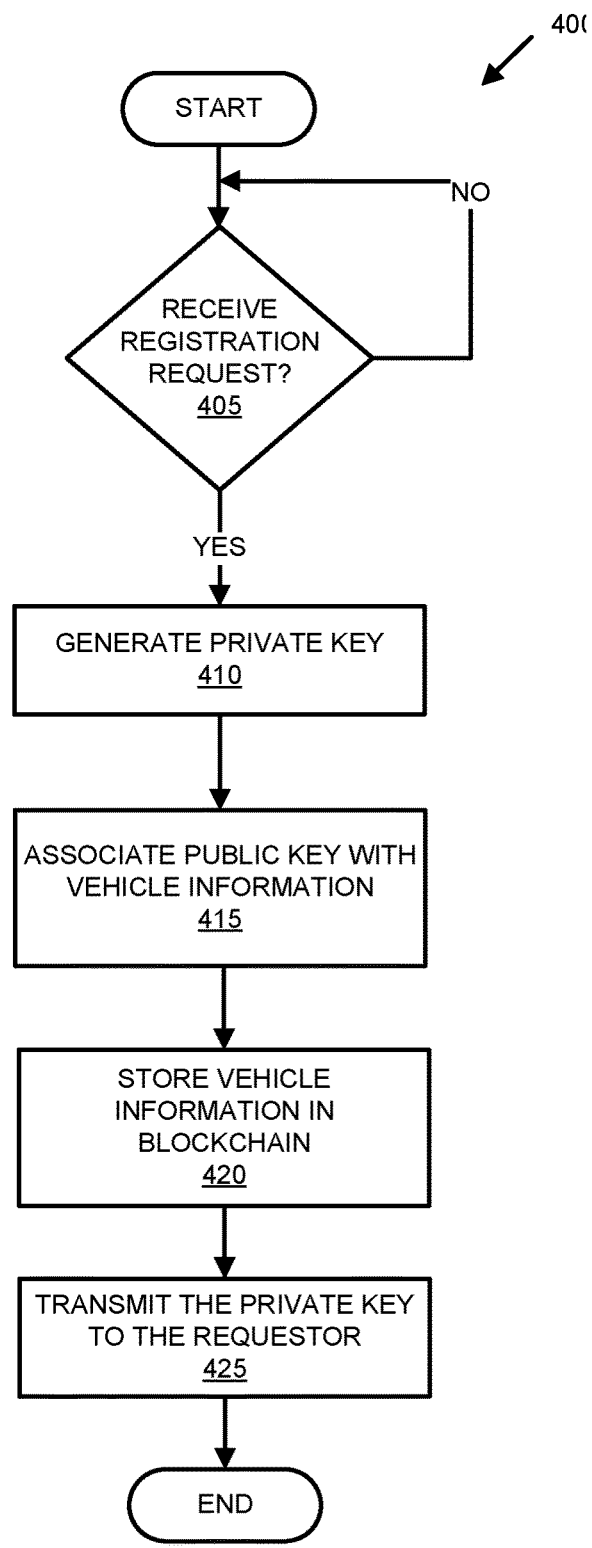
FIG. 4 is a flow diagram illustrating an example process for registering a vehicle to travel within a specific region with an entity.

FIG. 4 is a flowchart of an exemplary process 400 for receiving a request to register the vehicle 105 with an entity, such as a government entity, that provides certifications for transporting goods and/or traveling within specified regions. Blocks of the process 400 can be executed by the computer 235 of the server 115, and the server 115 is associated with the entity.

The process 400 begins at block 405 in which the computer 235 receives a request to register the vehicle 105 with the entity such that the vehicle 105 is approved to transport goods within the environment 120. For example, the computer 235 may receive a registration request from a TaaS operator via another computing device. The registration request can include vehicle information corresponding to the vehicle 105, such as a public identification information, or the like. At block 410, the computer 235 generates a private key corresponding to the vehicle 105. As discussed herein, the private key may be provided to the TaaS operator indicating the registered vehicle 105 is approved to transport goods within the environment 120 and is associated with at least one of multiple public keys authenticated by the server 115. In some implementations, the private key and corresponding public key comprise a polynomial.

At block 415, the computer 235 associates an authenticated public key with the vehicle information for the vehicle 105. At block 420, the vehicle information is stored in the blockchain 300. The private key is transmitted to the computing device of the TaaS operator at block 425. The TaaS operator may provide the private key to the vehicle 105 for storage in some implementations.

Figure 5:
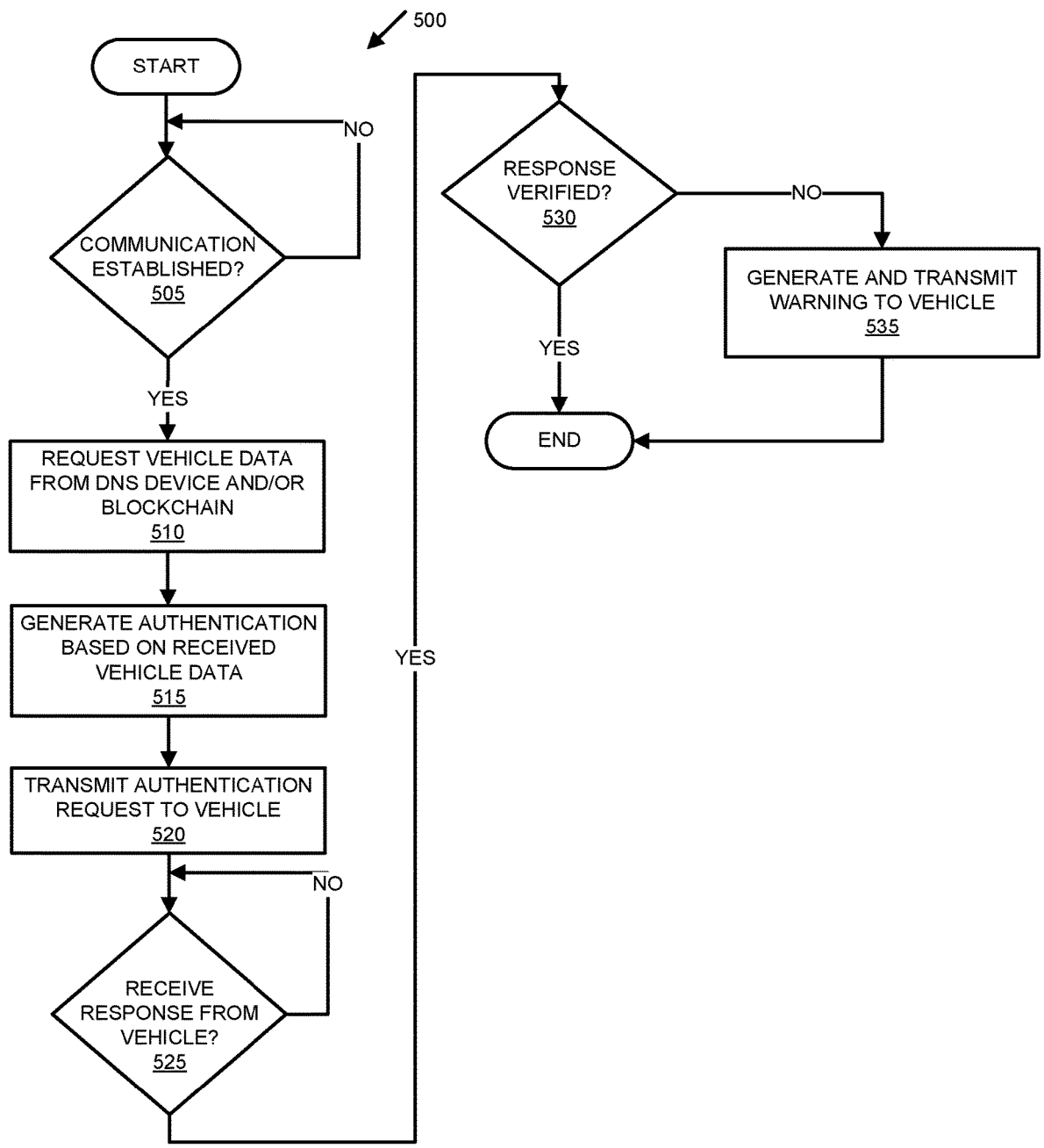
FIG. 5 is a flow diagram illustrating an example process for generating an authentication request and validating a response to the authentication request.

FIG. 5 illustrates an example flow diagram of a process 500 for validating the vehicle 105 within the environment 120. Blocks of the process 500 can be executed by the computer 235 of the server 115. The process 500 begins at block 505 in which a determination is made by the computer 235 whether communication has been established with a vehicle 105. For example, as the vehicle 105 is traveling through the environment 120, the vehicle 105 computer 210 may establish communication with the network device 110 and/or the server 115. If communication has not been established, the process 500 returns to block 505.

If communication is established, the computer 235 requests data pertaining to the vehicle 105 from the DNS device 113 and/or the blockchain 300 at block 510. For example, the server 115 passes the IP address of the vehicle 105 to the DNS 113. The DNS 113 retrieves domain name data pertaining to the vehicle 105 based on the IP address and transmits the retrieved domain name data to the server 115. The server 115 also retrieves vehicle 105 information from the blockchain 300. For example, the server 115 can retrieve the vehicle 105 data and/or public key information from the blockchain 300 using the domain name data.

At block 515, the computer 235 generates the authentication request based on the retrieved vehicle 105 data and/or domain name data. For example, the authentication request can be generated, in part, based on a public key corresponding to the vehicle 105, a domain name corresponding to the vehicle 105, an IP address corresponding to the vehicle 105, or the like. The authentication request can be generated in accordance with the blind evaluation of a polynomial protocol. In an example implementation, the authentication request comprises one or more selected points used to evaluate a polynomial, and the selected points may be randomly selected by the server 115.

At block 520, the computer 235 transmits the authentication request to vehicle 105. At block 525, a determination is made whether a ZKP response has been received from the vehicle 105 computer 210. The response may be one or more computed values corresponding to the selected points and the selected points. If no response has been received, the process 500 returns to block 520. As discussed above, the ZKP response can be generated by the computer 210 based on the private key of the vehicle 105.

If a response has been received, the computer 235 determines whether the ZKP response is authenticated, i.e., valid, at block 530 to determine whether the vehicle 105 is authorized to travel within the environment 120. The computer 235 can apply a suitable ZKP verification algorithm to the received ZKP response to determine whether the ZKP response is authenticate, i.e., that the vehicle approved to travel within the specific region. For instance, the ZKP response compare the computed values with corresponding computed values generated by the server 115 computer 235. The corresponding computed values can be generated by evaluating the public key with the selected points and comparing the evaluated public key with the received ZKP response. If the response is validated, the vehicle 105 is approved to travel within the specific region.

If the ZKP response is not authenticated, the computer 235 may transmit a warning to the vehicle 105 regarding the non-authenticated ZKP response at block 535. In response to receiving the warning, one or more vehicle systems may be actuated. For instance, the vehicle systems may be actuated by the computer 210 to cause the vehicle 105 to discontinue operation or to travel to a predetermined location within the environment 120. Otherwise, the process 500 ends.

Figure 6:
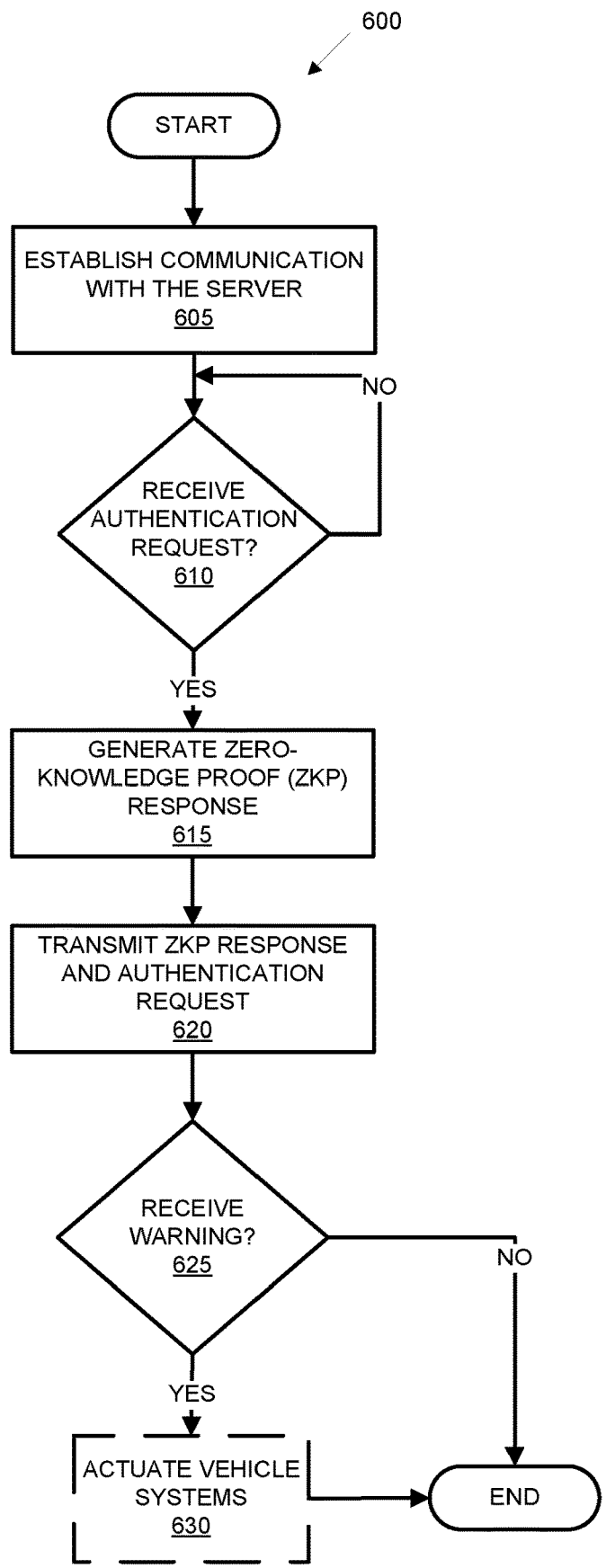
FIG. 6 is a flow diagram illustrating an example process for generating a zero-knowledge proof (ZPF) at a vehicle in response to an authentication request.

FIG. 6 is a flowchart of an exemplary process 600 for generating and providing a ZKP response. Blocks of the process 600 can be executed by the computer 210 of the vehicle 105. The process 600 begins at block 605 in which computer 210 establishes communication with the server 115, i.e., the entity. In an example implementation, the server 115 may cause the network device 110 to broadcast signals within the communication environment 120. The vehicle 105 communication module 230 can detect the signals and establishes communication via a suitable communication protocol with the server 115. At block 610, a determination is made whether an authentication request has been received. If no authentication request has been received, the process 600 returns to block 610. If the authentication request has been received, the computer 210 generates the ZKP response (ZKP proof) at block 615. The computer 210 can generate the ZKP response in accordance with the blind evaluation of a polynomial protocol. As discussed above, the computer 210 evaluates the polynomial using one or more selected points.

At block 620, the computer 210 transmits the ZKP response and the authentication request, e.g., selected points, to the server 115. At block 625, a determination is made whether a warning has been received. If a warning is received, the computer 210 can actuate one or more vehicle systems at block 630. In some implementations, the actuation may be based on instructions encoded in the warning communication or subsequent communications provided by the server 115.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   receive a registration corresponding to a vehicle computer, the registration including vehicle information;
   generate a private key and a public key corresponding to the vehicle computer, wherein the private key and the public key are indicative of a specific region that the vehicle is allowed to travel;
   store the public key and the vehicle information in a blockchain block;
   transmit the private key to the vehicle computer;
   transmit an authentication request to the vehicle computer;
   receive, from the vehicle computer, a response including data proving that the vehicle computer includes confidential information, wherein the data does not convey the confidential information;
   determine whether the response is valid based on the authentication request; and
   transmit a warning to the vehicle computer when the response is not valid.

2. The system of claim 1, wherein the authentication request comprises at least one point to be evaluated by the vehicle computer and the response comprises an evaluation of a polynomial using the at least one point.

3. The system of claim 1, wherein the vehicle computer causes at least one vehicle system to actuate based on the warning.

4. The system of claim 1, wherein the vehicle computer is disposed within a vehicle.

5. The system of claim 4, wherein the vehicle comprises at least one of a land vehicle, an aerial vehicle, or an aquatic vehicle.

6. The system of claim 4, wherein the processor is further programmed to:
   determine whether the vehicle is authorized to travel within a specific region based on the response.

7. The system of claim 1, wherein the private key comprises a polynomial.

8. The system of claim 1, wherein the processor is further programmed to:
   determine whether a communication link is established with the vehicle computer;
   retrieve the public key and the vehicle information from the blockchain block based on a communication packet received from the vehicle computer; and
   generate the authentication request based on at least one of the public key or the vehicle information.

9. The system of claim 1, wherein the processor is further programmed to:
   determine whether the response is valid by applying a blind evaluation of a polynomial protocol to the response.

10. A method comprising:
    receiving a registration corresponding to a vehicle computer, the registration including vehicle information;
    generating a private key and a public key corresponding to the vehicle computer, wherein the private key and the public key are indicative of a specific region that the vehicle is allowed to travel;
    storing the public key and the vehicle information in a blockchain block;

transmitting the private key to the vehicle computer;
transmitting an authentication request to the vehicle computer;
receiving, from the vehicle computer, a response including data proving that the vehicle computer includes confidential information, wherein the data does not convey the confidential information;
determining whether the response is valid based on the authentication request; and
transmitting a warning to the vehicle computer when the response is not valid.

11. The method of claim 10, wherein the authentication request comprises at least one point to be evaluated by the vehicle computer and the response comprises an evaluation of a polynomial using the at least one point.

12. The method of claim 10, wherein the vehicle computer causes at least one vehicle system to actuate based on the warning.

13. The method of claim 10, wherein the vehicle computer is disposed within a vehicle.

14. The method of claim 13, wherein the vehicle comprises at least one of a land vehicle, an aerial vehicle, or an aquatic vehicle.

15. The method of claim 13, further comprising:
determining whether the vehicle is authorized to travel within a specific region based on the response.

16. The method of claim 10, wherein the private key comprises a polynomial.

17. The method of claim 10, further comprising:
determining whether a communication link is established with the vehicle computer;
retrieving the public key and the vehicle information from the blockchain block based on a communication packet received from the vehicle computer; and
generating the authentication request based on at least one of the public key or the vehicle information.

18. The method of claim 10, further comprising:
determining whether the response is valid by applying a blind evaluation of a polynomial protocol to the response.

* * * * *